United States Patent [19]

Shieh

[11] Patent Number: 5,410,898

[45] Date of Patent: May 2, 1995

[54] LOCK DEVICE CAPABLE OF ACTIVATING AN ELECTRICAL ANTI-THEFT SYSTEM

[76] Inventor: Gary Shieh, 9F-4, No. 106, Sec. 3, Hsin-I Rd., Taipei, Taiwan, Prov. of China

[21] Appl. No.: 135,773

[22] Filed: Oct. 12, 1993

[51] Int. Cl.[6] .................... E05B 17/14; E05B 47/00
[52] U.S. Cl. ........................ 70/276; 70/271; 70/427; 70/DIG. 49
[58] Field of Search ......... 70/276, DIG. 49, 423–428, 70/455, 271

[56] References Cited

U.S. PATENT DOCUMENTS

| | | | |
|---|---|---|---|
| 3,434,318 | 3/1969 | Thiry | 70/455 |
| 4,594,866 | 6/1986 | Neyvet | 70/423 X |
| 4,858,454 | 8/1989 | McAnulty, III | 70/455 |
| 5,307,658 | 5/1994 | Kokubu et al. | 70/427 |
| 5,309,743 | 5/1994 | Kokubu et al. | 70/427 X |

*Primary Examiner*—Lloyd A. Gall
*Attorney, Agent, or Firm*—Pennie & Edmonds

[57] ABSTRACT

A lock device includes a lock body with a lock shell, a key plug received in the lock shell, and an anti-dusting cover assembly secured on a front end of the lock shell. The key plug has a front end which is formed with a recess that has an end wall which is formed with a keyhole. The cover assembly includes a cover plate with a key slot that is aligned with the keyhole, and an anti-dusting plate mounted pivotally to a rear wall surface of the cover plate. A magnet is mounted on a rear wall surface of the anti-dusting plate. A magnetic conductor is provided on the front end of the key plug in a pivoting direction of the anti-dusting plate. A magnetic reed switch is provided on the lock shell and is normally disposed adjacent to the magnetic conductor. The magnetic reed switch is activated by the magnet via the magnetic conductor when the anti-dusting plate pivots rearwardly to locate the magnet adjacent to the magnetic conductor due to insertion of an article into the keyhole of the key plug. A control circuit is capable of activating an electrical anti-theft system when rotation of the key plug relative to the lock shell in order to unlock the lock device does not occur within a predetermined time period when the control circuit is activated by the magnetic reed switch.

4 Claims, 7 Drawing Sheets

LOCK DEVICE CAPABLE OF ACTIVATING AN ELECTRICAL ANTI-THEFT SYSTEM

BACKGROUND OF THE INVENTION

1. Field of the Invention

The invention relates to a lock device, more particularly to a lock device which is capable of activating an electrical anti-theft system.

2. Description of the Related Art

Figure 1:
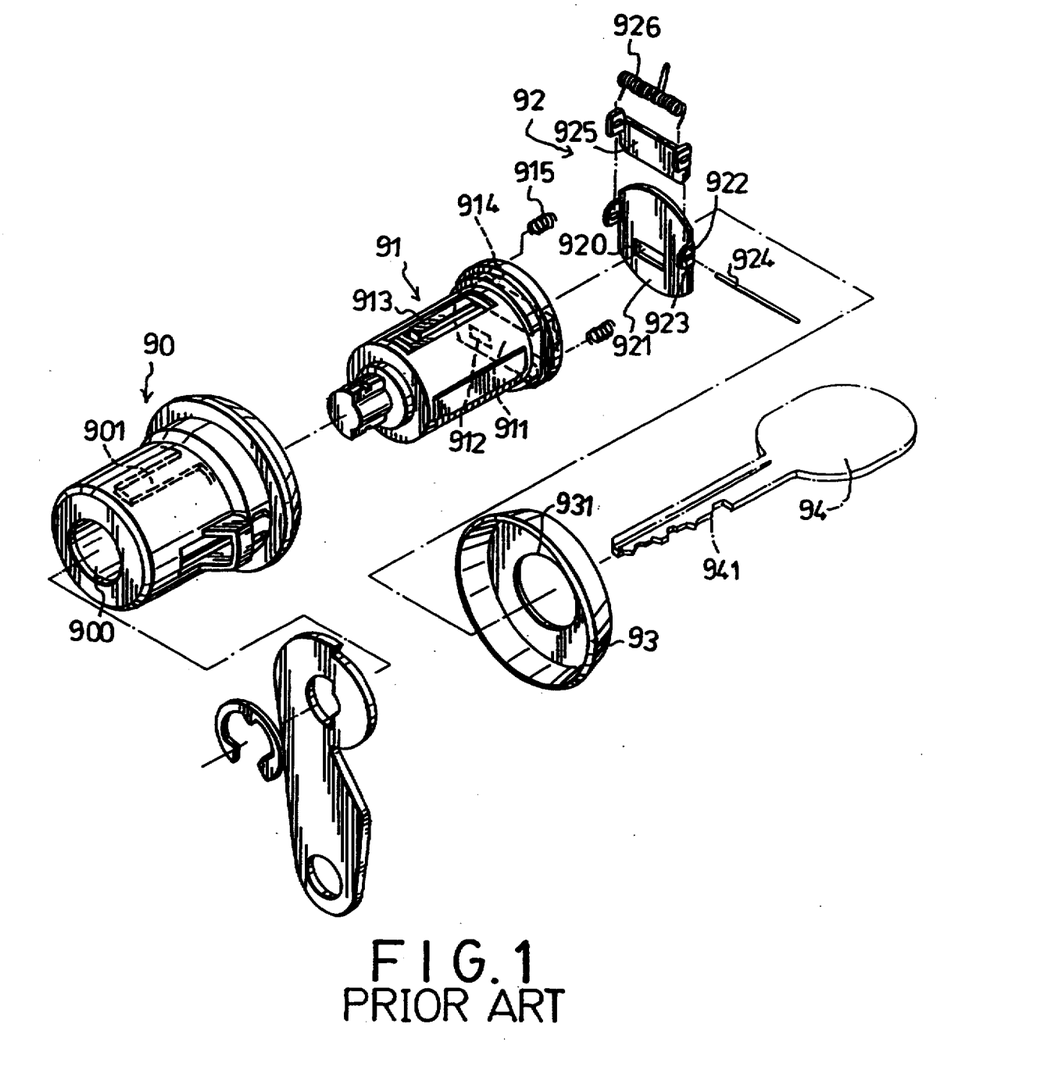
FIG. 1 is an exploded view of a conventional vehicle door lock.

Referring to FIG. 1, a conventional vehicle door lock is shown to comprise a lock shell 90, a key plug 91, an anti-dusting cover assembly 92 and an annular retaining cap 93. The lock shell 90 is an elongated hollow member which confines a through-hole 900 for receiving the key plug 91 therein. The lock shell 90 has an inner wall surface which is formed with an axially extending retaining groove 901. The key plug 91 has a recessed front end 911 with an end wall that is formed with a keyhole 912. Tumbler members (not shown) extend into the keyhole 912 and are connected to an axially extending retaining unit 913 which projects from an external wall surface of the key plug 91. The front end 911 has two inner side walls which are formed with a respective spring-receiving groove 914 for receiving a spring 915 therein. The anti-dusting cover assembly 92 is secured on the key plug 91 by means of the annular retaining cap 93 and includes a cover plate 921 which is formed with a key slot 920 and which has two sides that are respectively provided with two rearwardly extending pivot ears 922. A pivot pin 924 extends between the pivot ears 922 and has two ends which extend into a pivot hole 923 that is formed in a respective one of the pivot ears 922. The cover assembly 92 further includes an anti-dusting plate 925 which has two sides that are mounted pivotally on the pivot pin 924. The anti-dusting plate 925 is used to cover the key slot 920 of the cover plate 921 and is biased so as to abut normally against the cover plate 921 by means of a torsion spring 926 which is disposed around the pivot pin 924. The annular retaining cap 93 is provided on the front end of the lock shell 90 and is formed with a through-hole 931. The springs 915 bias the cover plate 921 toward the annular retaining cap 93 in order to prevent the entry of dust via the through-hole 931 of the latter.

When a key 94 is inserted into the key slot 920 of the cover plate 921 so as to unlock the door lock, the key 94 pushes the anti-dusting plate 925 to pivot rearwardly against the action of the torsion spring 926. When the key 94 extends into the keyhole 912, the key bits 941 of the key 94 activate the tumbler members in order to permit disengagement of the retaining unit 913 from the retaining groove 901, thereby permitting the rotation of the key plug 91 relative to the lock shell 90 to unlock the door lock.

The above procedure for unlocking the conventional door lock is usually accomplished within one to two seconds. The length of time required to pick the conventional door lock with the use of a screw driver, a universal key or a similar article, however, ranges from a few seconds to a few minutes, depending upon the skill of the thief.

Note that the conventional electrical anti-theft systems installed in most vehicles are activated only after one of the doors of a vehicle is opened or after the vehicle is moved. Accordingly, there is thus a need to provide a lock device which is capable of activating a conventional electrical anti-theft system before the door of a vehicle can be opened when the lock device is being picked.

SUMMARY OF THE INVENTION

Therefore, the objective of the present invention is to provide a lock device which is capable of activating a conventional electrical anti-theft system before the former can be unlocked when the lock device is being picked.

Another objective of the present invention is to provide a lock device which can be used as a vehicle door lock, a household door lock and the like so as to prevent theft.

Accordingly, the lock device of the present invention is capable of activating an electrical anti-theft system and comprises:

- a lock body that includes an elongated hollow lock shell which has a front end and which confines a through-hole, a key plug received in the through-hole of the lock shell, the key plug having a front end which is formed with a recess that has an end wall which is formed with a keyhole, and an anti-dusting cover assembly which is secured on the front end of the lock shell and which includes a cover plate with a key slot that is aligned with the keyhole and a rear wall surface, and an anti-dusting plate mounted pivotally to the rear wall surface of the cover plate, the anti-dusting plate covering the key slot of the cover plate and having a rear wall surface;
- a magnet mounted on the rear wall surface of the anti-dusting plate;
- a magnetic conductor provided on the front end of the key plug in a pivoting direction of the anti-dusting plate;
- a magnetic reed switch provided on the lock shell and normally disposed adjacent to the magnetic conductor, the magnetic reed switch being activated by the magnet via the magnetic conductor when the anti-dusting plate pivots rearwardly to locate the magnet adjacent to the magnetic conductor due to insertion of an article into the keyhole of the key plug via the key slot of the cover plate so as to rotate the key plug relative to the lock shell; and
- a control circuit connected to the magnetic reed switch and activated when the magnetic reed switch is activated, the control circuit activating the electrical anti-theft system when rotation of the key plug relative to the lock shell in order to unlock the lock device and move the magnetic conductor away from the magnetic reed switch to deactivate the magnetic reed switch and the control circuit does not occur within a predetermined time period when the control circuit is activated.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 2:
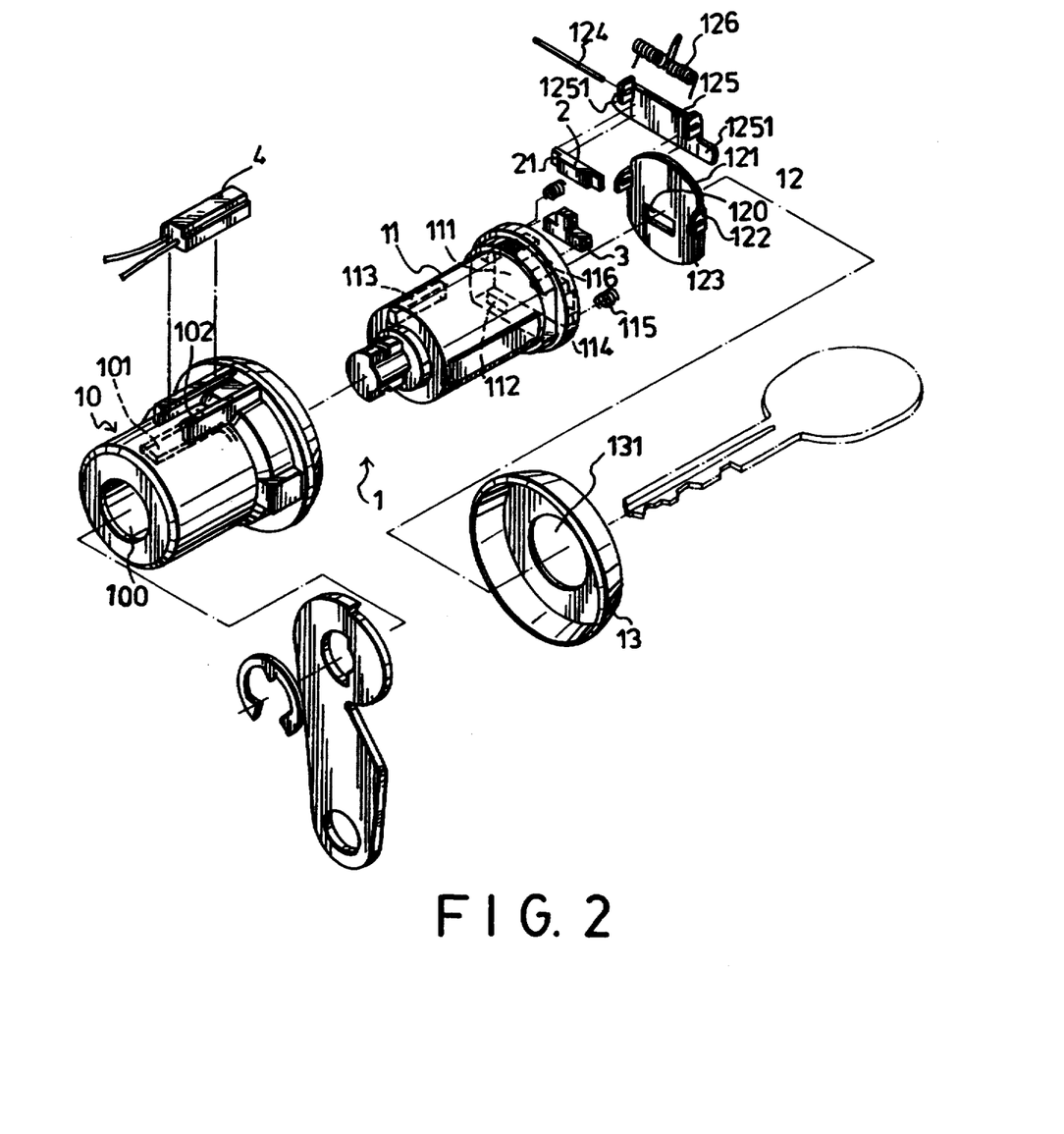
FIG. 2 is an exploded view of a vehicle door lock according to the present invention.
Figure 3:
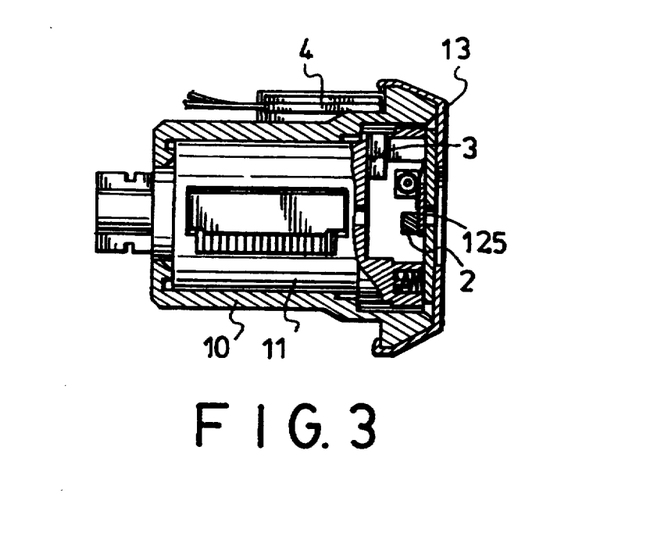
FIG. 3 is a sectional view illustrating the assembly of the vehicle door lock shown in FIG. 2.

Referring to FIGS. 2 and 3, the first preferred embodiment of a lock device according to the present invention is shown to be configured for use as a vehicle door lock and comprises a lock body 1, a magnet 2, a magnetic conductor 3, a magnetic reed switch 4 and a control circuit 5.

The lock body 1 includes a lock shell 10, a key plug 11, an anti-dusting cover assembly 12 and an annular retaining cap 13. The lock shell 10 is an elongated hollow member which confines a through-hole 100 for receiving the key plug 11 therein. The lock shell 10 has an inner wall surface which is formed with an axially extending retaining groove 101, and an outer wall surface which is formed with an axially extending positioning groove 102. The key plug 11 has a front end which is formed with a recess 111 that has an end wall which is formed with a keyhole 112. Tumbler members (not shown) extend into the keyhole 112 and are connected to an axially extending retaining unit 113 which projects from an external wall surface of the key plug 11. The recess 111 further has a top wall which is formed with a retaining groove 116 and two opposite side walls which are formed with a respective spring-receiving groove 114 for receiving a spring 115 therein. The anti-dusting cover assembly 12 is secured on the key plug 11 by means of the annular retaining cap 13 and includes a cover plate 121 which is formed with a key slot 120 that is aligned with the keyhole 112 and which has two sides that are respectively provided with two rearwardly extending pivot ears 122. A pivot pin 124 extends between the pivot ears 122 and has two ends which extend into a pivot hole 123 that is formed in a respective one of the pivot ears 122. The cover assembly 12 further includes an anti-dusting plate 125 which has two sides that are mounted pivotally on the pivot pin 124. The anti-dusting plate 125 is thus mounted pivotally to the rear wall surface of the cover plate 121 and is used to cover the key slot 120 of the cover plate 121. The anti-dusting plate 125 is biased so as to abut normally against the cover plate 121 by means of a torsion spring 126 which is disposed around the pivot pin 124. The anti-dusting plate 125 has two sides which are respectively formed with a flange 1251. The annular retaining cap 13 is provided on the front end of the lock shell 10 and is formed with a through-hole 131. The springs 115 bias the cover plate 121 toward the annular retaining cap 13 in order to prevent the entry of dust via the through-hole 131 of the latter.

The magnet 2 is mounted on the rear wall surface of the anti-dusting plate 125. In this embodiment, the magnet 2 is a rectangular bar with two thinned ends 21. The flanges 1251 of the anti-dusting plate 125 are folded so as to overlap the thinned ends 21 of the magnet 2, thereby securing the latter onto the anti-dusting plate 125.

The magnetic conductor 3 is made of a soft iron material and is provided within the retaining groove 116 that is formed in the top wall of the recess 111 in the front end of the key plug 11. The magnetic conductor 3 is generally T-shaped and has a narrow portion which is disposed adjacent to the periphery of the key plug 11 and a wide portion which is disposed adjacent to the recess 111. The magnetic conductor 3 serves as a magnetic field conductor for the magnet 2 when the anti-dusting plate 125 pivots rearwardly due to the insertion of an article through the key slot 120 of the cover plate 121, as will be detailed in the succeeding paragraphs.

Figure 4:
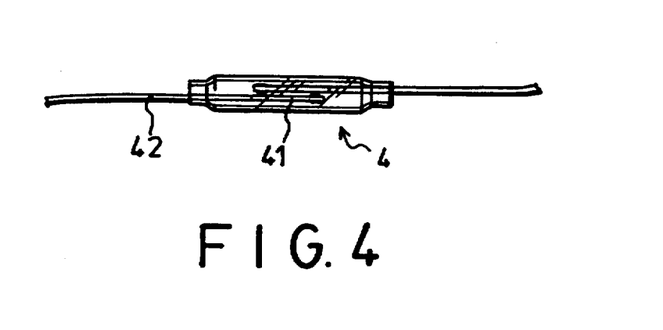
FIG. 4 illustrates a magnetic reed switch that is employed in the present invention.

The magnetic reed switch 4 is disposed within the positioning groove 102 on the outer surface of the lock shell 10 and is normally disposed adjacent to the magnetic conductor 3. Referring to FIG. 4, the magnetic reed switch 4 includes a pair of conductive pieces 41 and a pair of electrical conductors 42 which extend from the conductive pieces 41. The conductive pieces 41 are in electrical contact when a magnetic field is applied on the magnetic reed switch 4.

Figure 5:
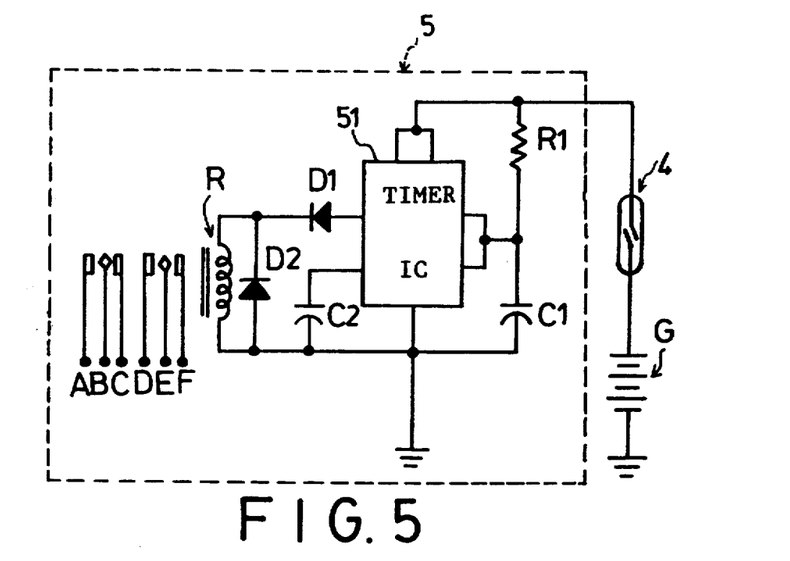
FIG. 5 is a schematic electrical circuit diagram of a control circuit that is employed in the present invention.
Figure 6:
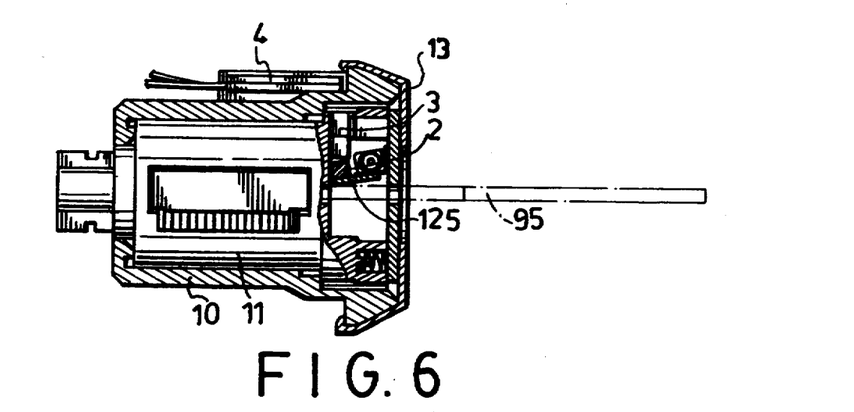
FIG. 6 is a sectional view which illustrates the vehicle door lock of the present invention when a key is being inserted therein.
Figure 7:
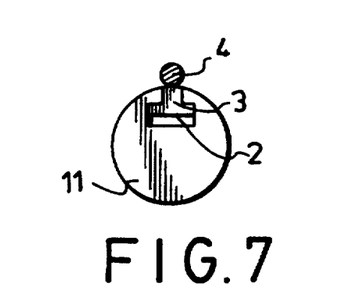
FIG. 7 illustrates the position of a key plug of the vehicle door lock of the present invention when the control circuit is in an ON state.

FIG. 5 is a schematic electrical circuit diagram of the control circuit 5. The magnetic reed switch 4 interconnects the control circuit 5 and an electrical power source, such as a battery unit (G). The control circuit 5 includes a timer circuit and a relay (R). The timer circuit includes a timer integrated circuit 51, capacitors (C1, C2), a resistor (R1) and a diode (D1). The capacitor (C1) and the resistor (R1) are used to set a predetermined time period, such as three seconds, for the timer integrated circuit 51. The capacitor (C1) and the resistor (R1) are replaceable so as to vary the predetermined time period. The contact terminals (A–F) of the relay (R) may be connected to more than one conventional electrical anti-theft system (not shown). When the magnetic reed switch 4 is in an ON state, the timer integrated circuit 51 is connected to the battery unit (G), thereby activating the timer integrated circuit 51 to conduct a counting action until the predetermined time period is reached. When the predetermined time period is reached, the timer integrated circuit 51 generates an output signal for energizing the relay (R). The electrical anti-theft systems can be activated automatically at this stage.

Figure 8:
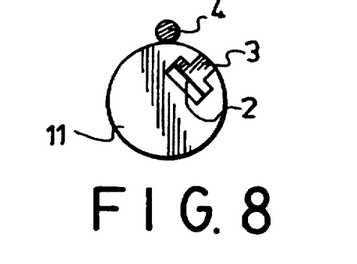
FIG. 8 illustrates the position of the key plug of the vehicle door lock of the present invention when the control circuit is in an OFF state.

Referring once more to FIGS. 2 to 7, when an article 95, such as a key, is inserted into the key slot 120 of the cover plate 121, the article 95 pushes the anti-dusting plate 125 to pivot rearwardly against the action of the torsion spring 126. The magnet 2 is disposed adjacent to the magnetic conductor 3, thereby enabling the magnetic reed switch 4 to receive the magnetic field from the magnet 2 via the magnetic conductor 3. Electrical contact between the conductive pieces 41 of the magnetic reed switch 4 occurs, thereby activating the latter. The timer integrated circuit 51 is activated to conduct a counting action at this stage. If the key plug 11 is rotated relative to the lock shell 10 within the predetermined time period of the timer integrated circuit 51, as shown in FIG. 8, the magnetic reed switch 4 ceases to receive the magnetic field from the magnet 2. The magnetic reed switch 4 is deactivated, thereby deactivating the timer integrated circuit 51.

If an article 95, other than the proper key, is used to unlock the lock device, it is unlikely that the key plug 11 will be rotated relative to the lock shell 10 within the predetermined time period of the timer integrated circuit 51. Thus, at the end of the predetermined time period, the timer integrated circuit 51 energizes the relay (R) to activate correspondingly the conventional electrical anti-theft system. The objective of activating the conventional electrical anti-theft system before the lock device can be unlocked has thus been achieved.

Figure 9:
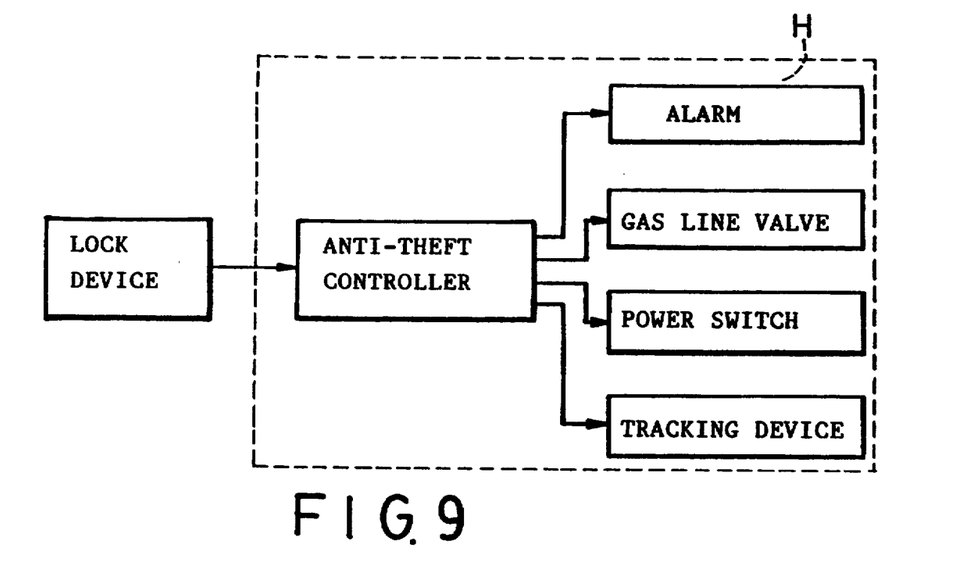
FIG. 9 is a circuit block diagram which illustrates the control circuit when connected to a conventional electrical anti-theft system.

FIG. 9 illustrates the lock device when used with a conventional electrical anti-theft system (H). The electrical anti-theft system (H) includes an anti-theft controller which is connected to the lock device. When the relay (R) of the lock device is energized, the anti-theft controller is activated to activate correspondingly a plurality of devices, such as an alarm device, a gas line valve, a power switch and a tracking device. Alternatively, the lock device of the present invention can be connected directly to at least one of the above-mentioned devices.

Figure 10:
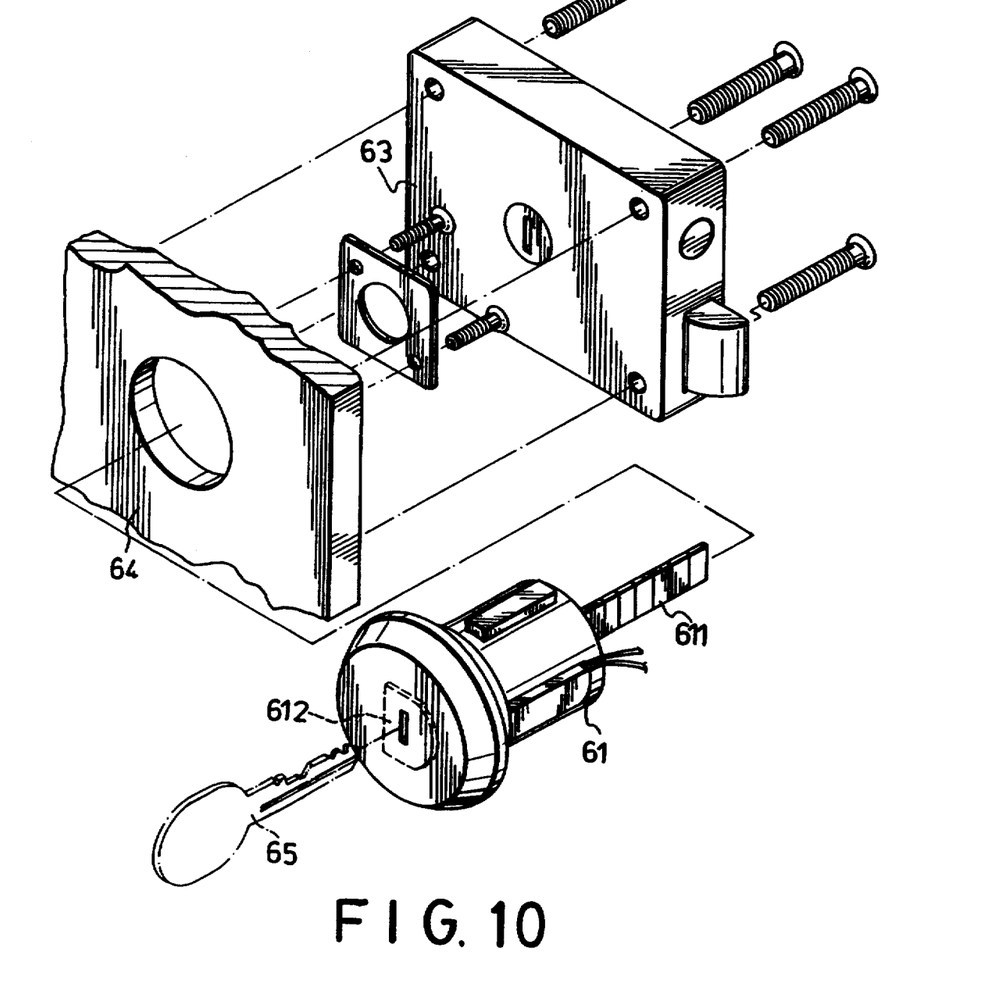
FIG. 10 is a partially exploded view of a household door lock according to the present invention.
Figure 11:
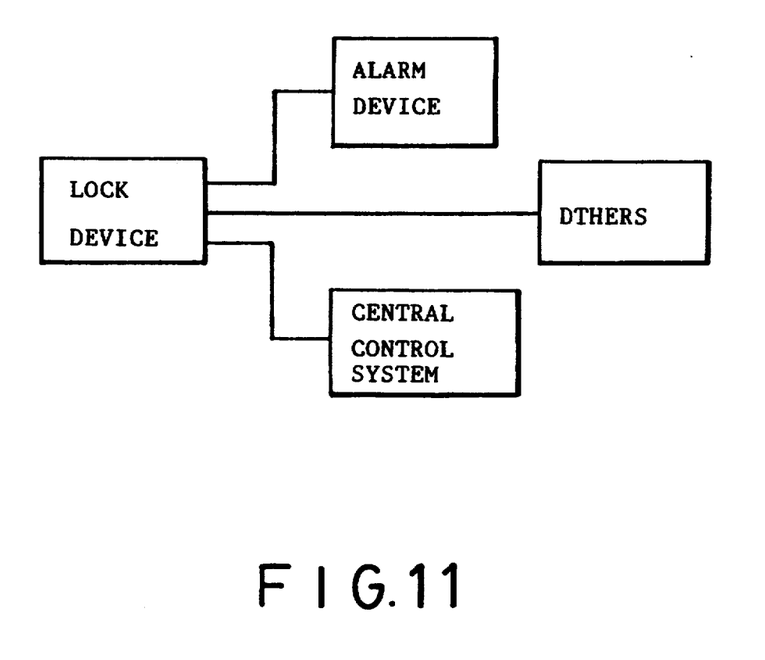
FIG. 11 is a circuit block diagram which illustrates the household door lock when connected to a conventional electrical anti-theft system.

Referring to FIG. 10, the second preferred embodiment of a lock device according to the present invention is shown to be configured for use as a household door lock. The construction of the second preferred embodiment is generally similar to that of the first preferred embodiment. The lock body 61 of the lock device is to be mounted on a door 64 and has a rear end which is provided with an elongated activating plate 611. When a key 65 is inserted into the lock body 61 in order to unlock the lock device, the anti-dusting plate 612 pivots rearwardly in order to permit activation of the magnetic reed switch. When the key plug of the lock body 61 is rotated, the activating plate 611 rotates therewith in order to actuate a deadbolt 63. As with the previous embodiment, if the key plug was not rotated within a predetermined time period, the lock device activates a conventional electrical anti-theft system. FIG. 11 illustrates the second preferred embodiment when used with a conventional electrical anti-theft system that includes an alarm device and a central control system, such as a building security control system.

The advantages and characterizing features of the lock device of the present invention are as follows:

1. The lock device is simple in construction. Aside from the control circuit, the main difference between the present invention and the prior art resides in the addition of three more elements.

2. The features of the original lock device are not affected.

3. The lock device can be used with a motor horn or with one or more conventional electrical anti-theft systems.

4. If the control circuit becomes defective, the present invention still retains the functions of a conventional lock device.

5. The lock device is very practical to use. Since the lock device is capable of activating an electrical anti-theft system when the lock device is being picked, the risk of theft can be minimized.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A lock device capable of activating an electrical anti-theft system, said lock device comprising a lock body that includes an elongated hollow lock shell which has a front end and which confines a through-hole, a key plug received in said through-hole of said lock shell, said key plug having a front end which is formed with a recess that has an end wall which is formed with a keyhole, and an anti-dusting cover assembly which is secured on said front end of said key plug and which includes a cover plate with a key slot that is aligned with said keyhole and a rear wall surface, and an anti-dusting plate mounted pivotally to said rear wall surface of said cover plate, said anti-dusting plate covering said key slot of said cover plate and having a rear wall surface, said lock device further comprising:

a magnet mounted on said rear wall surface of said anti-dusting plate;

a magnetic conductor provided on said front end of said key plug in a pivoting direction of said anti-dusting plate;

a magnetic reed switch provided on said lock shell and normally disposed adjacent to said magnetic conductor, said magnetic reed switch being activated by said magnet via said magnetic conductor when said anti-dusting plate pivots rearwardly to locate said magnet adjacent to said magnetic conductor due to insertion of an article into said keyhole of said key plug via said key slot of said cover plate so as to rotate said key plug relative to said lock shell; and a control circuit connected to said magnetic reed switch and activated when said magnetic reed switch is activated, said control circuit activating said electrical anti-theft system when rotation of said key plug relative to said lock shell in order to unlock said lock device and move said magnetic conductor away from said magnetic reed switch to deactivate said magnetic reed switch and said control circuit does not occur within a predetermined time period when said control circuit is activated.

2. The lock device as claimed in claim 1, wherein said recess in said front end of said key plug has a top wall which is formed with a retaining groove for receiving said magnetic conductor therein.

3. The lock device as claimed in claim 1, wherein said lock shell has an outer wall surface which is formed with an axially extending positioning groove for receiving said magnetic reed switch therein.

4. The lock device as claimed in claim 1, wherein said control circuit comprises:

a timer means which is connected to said magnetic reed switch and which generates an output signal after being activated by said magnetic reed switch for said predetermined time period; and a relay means which is connected to said timer means and which activates said electrical anti-theft system when energized by said output signal from said timer means.

* * * * *